(12) United States Patent
Ozawa

(10) Patent No.: US 11,581,546 B2
(45) Date of Patent: Feb. 14, 2023

(54) CATALYST LAYER, MEMBRANE ELECTRODE ASSEMBLY, AND POLYELECTROLYTE FUEL CELL

(71) Applicant: TOPPAN PRINTING CO., LTD., Tokyo (JP)

(72) Inventor: Madoka Ozawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 25 days.

(21) Appl. No.: 17/029,662

(22) Filed: Sep. 23, 2020

(65) Prior Publication Data

US 2021/0013518 A1    Jan. 14, 2021

Related U.S. Application Data

(63) Continuation of application No. PCT/JP2019/014349, filed on Mar. 29, 2019.

(30) Foreign Application Priority Data

Mar. 30, 2018    (JP) .............................. JP2018-069438

(51) Int. Cl.
*H01M 4/86*    (2006.01)
*H01M 8/1004*    (2016.01)
*H01M 8/10*    (2016.01)

(52) U.S. Cl.
CPC ....... *H01M 4/8626* (2013.01); *H01M 4/8673* (2013.01); *H01M 8/1004* (2013.01); *H01M 2008/1095* (2013.01)

(58) Field of Classification Search
CPC ............. H01M 4/8626; H01M 4/8673; H01M 8/1004; H01M 2008/1095; H01M 4/8605; H01M 4/926; Y02E 60/50
See application file for complete search history.

(56) References Cited

U.S. PATENT DOCUMENTS

2005/0074651 A1*  4/2005  Kidai ................. H01M 8/0289
                                                                429/492
2005/0238948 A1* 10/2005  Mei ....................... H01M 4/921
                                                                429/483

(Continued)

FOREIGN PATENT DOCUMENTS

JP    H10-241703 A    9/1998
JP       3617237 B2    2/2005

(Continued)

OTHER PUBLICATIONS

International Searching Authority, "International Search Report," issued in connection with International Patent Application No. PCT/JP2019/014349, dated Jun. 18, 2019.

(Continued)

*Primary Examiner* — Lisa S Park
(74) *Attorney, Agent, or Firm* — Foley & Lardner LLP

(57) ABSTRACT

A catalyst layer comprising an interface to a polyelectrolyte membrane, the catalyst layer includes a layer forming material, which includes a catalytic substance, a conductive carrier which supports the catalytic substance, a polyelectrolyte, and a fibrous material, and a plurality of pores which contain no layer forming material. A pore area ratio which is a total area ratio of the plurality of pores to an area of a cross-section orthogonal to the interface is 25.0% or more and 35.0% or less in a cross-sectional image captured by a scanning electron microscope.

9 Claims, 3 Drawing Sheets

(56) References Cited

U.S. PATENT DOCUMENTS

| | | | |
|---|---|---|---|
| 2006/0093893 A1 | 5/2006 | Matsuo et al. | |
| 2007/0286948 A1* | 12/2007 | Shimoda | H01M 8/0245 427/372.2 |
| 2009/0087711 A1* | 4/2009 | Ueno | H01M 8/0245 429/514 |

FOREIGN PATENT DOCUMENTS

| | | | |
|---|---|---|---|
| JP | 2006-134630 A | | 5/2006 |
| JP | 2011-165362 A | | 8/2011 |
| JP | 5537178 B2 | | 7/2014 |
| JP | 2017-069056 | * | 4/2017 |
| JP | 2017-069056 A | | 4/2017 |

OTHER PUBLICATIONS

International Searching Authority, "Written Opinion," issued in connection with International Patent Application No. PCT/JP2019/014349, dated Jun. 18, 2019.

Extended European Search Report dated Apr. 29, 2021 for corresponding European Patent Application No. 19778208.9.

* cited by examiner

CATALYST LAYER, MEMBRANE ELECTRODE ASSEMBLY, AND POLYELECTROLYTE FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/014349, filed on Mar. 29, 2019, which is based upon and claims the benefit of priority to Japanese Patent Application No. 2018-069438, filed on Mar. 30, 2018, the disclosures of which are all incorporated herein by reference in their entireties.

BACKGROUND

Technical Field

The present invention relates to a catalyst layer, a membrane electrode assembly, and a polyelectrolyte fuel cell.

Background Art

Fuel cells are power generation systems that produce electricity through chemical reactions of hydrogen and oxygen. The fuel cells have features such as high efficiency, low environmental burden, and low noise compared with other conventional power generation systems and have received attention as clean energy sources. In particular, polyelectrolyte fuel cells usable in the vicinity of room temperature are regarded as promising for use in an in-vehicle power source or a stationary power source for domestic use, and various research and development regarding polyelectrolyte fuel cells has been carried out in recent years. Problems with practical use are, for example, how to improve cell performances such as power-generating characteristics and durability, to build infrastructure, and to reduce production costs.

Generally, polyelectrolyte fuel cells are formed by stacking many single cells. A single cell includes a membrane electrode assembly sandwiched between separators including gas flow channels and cooling water flow channels. The membrane electrode assembly includes a polyelectrolyte membrane with a fuel electrode (anode), which supplies fuel gas, and an oxygen electrode (cathode), which supplies an oxidizing agent, bonded on either side of the polyelectrolyte membrane. The fuel electrode (anode) and the oxygen electrode (cathode) are mainly constituted by a catalyst layer and a gas diffusion layer. The catalyst layer includes at least a catalytic substance such as a platinum group noble metal, a conductive carrier, and a polyelectrolyte. The gas diffusion layer has gas permeability and conductivity.

The polyelectrolyte fuel cells produce electricity through the following electrochemical reactions. First, in a fuel electrode catalyst layer, hydrogen contained in the fuel gas is oxidized by the catalytic substance to generate protons and electrons. The generated protons pass through the polyelectrolyte in the catalyst layer and the polyelectrolyte membrane, which is in contact with the catalyst layer, and reach an oxygen electrode catalyst layer. Simultaneously generated electrons pass through the conductive carrier in the catalyst layer, the gas diffusion layer, which is in contact with the side of the catalyst layer on the opposite side to that facing the polyelectrolyte membrane, the separator, and an external circuit and reach the oxygen electrode catalyst layer. In the oxygen electrode catalyst layer, the protons and the electrons react with the oxygen contained in the oxidant gas and generate water.

The gas diffusion layer has the role of diffusing gas supplied from the separator and supplying the gas into the catalyst layer. The pores in the catalyst layer are located further ahead of the separator and the gas diffusion layer, and serve as channels for transporting substances such as gas and generated water. The pores of the fuel electrode are expected to smoothly supply the fuel gas to triple phase boundaries, which are reaction fields of oxidation and reduction. Additionally, the pores of the oxygen electrode are required to smoothly supply the oxidant gas. It is important that the catalyst layer has sufficient voids, and the structure is not too dense in order to smoothly supply gas.

To prevent the catalyst layer from having a dense structure, for example, catalyst layers that include carbon particles with different particle sizes or carbon fibers with different fiber lengths have been proposed (PTL 1 and 2).

[Citation List] [Patent Literature] [PTL 1] JP 3617237 B; [PTL 2] JP 5537178 B

SUMMARY OF THE INVENTION

Technical Problem

In PTL 1, the catalyst layer is prevented from being too dense by combining carbon particles having different particle diameters. In PTL 2, voids are formed in the catalyst layer by combining carbon fibers having different fiber lengths. However, these proposals do not specify the optimal ratio of the pores in the catalyst layer, the pore size, or its distribution.

It is an object of the present invention to provide a catalyst layer that is improved or even excellent in transport mass properties, that is, a catalyst layer that is capable of exerting high power generation performance for a long period when the catalyst layer constitutes a membrane electrode assembly of a polyelectrolyte fuel cell.

Solution to Problem

To improve or even solve the above problem, the catalyst layer according to one aspect of the present invention is a catalyst layer including a interface with a polyelectrolyte membrane and includes the following configurations (1) and (2).

(1) The catalyst layer includes a layer forming material, which contains a catalytic substance, a conductive carrier which supports the catalytic substance, a polyelectrolyte, and a fibrous material, and pores which contains no layer forming material.

(2) A pore area ratio, which is a ratio of a total area of the pores to an area of a cross-section orthogonal to the interface with the polyelectrolyte membrane, is 25.0% or more and 35.0% or less in a cross-sectional image captured by a scanning electron microscope.

Advantageous Effects of the Invention

According to one aspect of the present invention, a catalyst layer that is improved or even excellent in substance transport properties is provided. A polyelectrolyte fuel cell that is provided with the membrane electrode assembly including the catalyst layer according to one aspect of the present invention is expected to have high power generation performance for a long period.

BRIEF DESCRIPTION OF THE DRAWINGS

FIG. 1(a) is when the area ratio of pores (black pixels when binarized) is high, and the pore-size distribution is large. FIG. 1(b) is when the area ratio of pores (black pixels when binarized) is low, and the pore-size distribution is narrow.

DETAILED DESCRIPTION

Figure 1A:
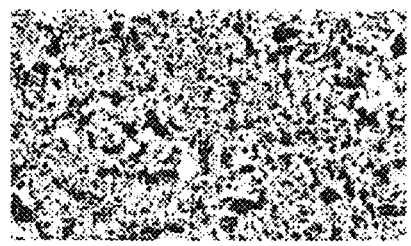
FIGS. 1(a) and 1(b) show a binarized image of a cross-sectional SEM image of a catalyst layer.

Embodiments of the present invention will be described below with reference to the drawings. In the following description of the drawings to be referred, components identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

Embodiments of the present invention will be described below with reference to the drawings. In the drawings described below, the corresponding portions are given the same reference numerals, and redundant description is omitted as appropriate. The embodiments are merely examples of configurations for embodying the technical idea of the present invention, and do not specify the materials, shapes, structures, arrangements, sizes, or the like of the components. The technical idea of the present invention may be modified in various manners within the technical scope defined by the claims.

An embodiment of the present invention will be described below with reference to the drawings.

It should be noted that the present invention is not limited to the following embodiment. Design modifications can be made on the basis of the knowledge of a person skilled in the art, and such modifications are also included in the scope of the present invention. Additionally, each of the drawings is exaggerated as required to facilitate understanding.

As a result of intensive studies on the initial power generation performance of a polyelectrolyte fuel cell, the inventor of the present application found that the performance is significantly affected by the mass transport properties of a catalyst layer. The inventor of the present application improved the properties of the catalyst layer in transporting gas and produced water by partially forming wide voids in the catalyst layer. As a result, the decrease in the output and the deterioration of the catalyst layer are inhibited, and the inventor succeeded in obtaining a polyelectrolyte fuel cell that exerts high power generation performance for a long period.

Figure 1B:
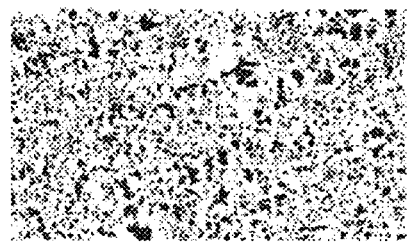

Conventionally, the optimal ratio of the pores in the catalyst layer, the pore size, and its distribution have not been considered, but the inventor of the present application found the following. That is, compared with the catalyst layer in which the area ratio of the pores (black pixels when binarized) is low, and the pore-size distribution is narrow in a cross-section orthogonal to the interface of the catalyst layer to the polyelectrolyte membrane as shown in FIG. 1(b), the catalyst layer in which the area ratio of the pores is high, and the pore-size distribution is wide as shown in FIG. 1(a) has improved gas permeability and improved produced water drainage properties while maintaining triple phase boundaries.

[Configuration of Catalyst Layer]

Figure 2:
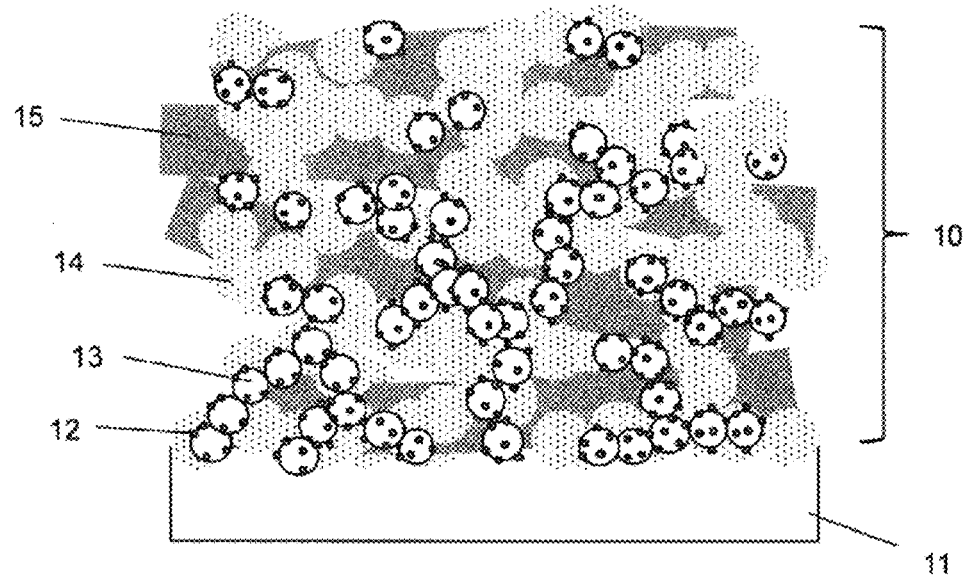
FIG. 2 is a schematic cross-sectional view illustrating the structure of a catalyst layer according to an embodiment.

As shown in FIG. 2, a catalyst layer 10 of the present embodiment has a interface with a polyelectrolyte membrane 11 and includes, as a layer forming material, a catalytic substance 12, a conductive carrier 13, a polyelectrolyte 14, and a fibrous material 15. Portions not containing the layer forming material are pores.

In the catalyst layer 10, a pore area ratio (Sp/S0), which is the ratio of the total area (Sp) of the pores to the area (S0) of the cross-section orthogonal to the interface with the polyelectrolyte membrane 11 (cross-section in the thickness direction), is 25.0% or more and 35.0% or less in the cross-sectional image captured by a scanning electron microscope (hereinafter, referred to as cross-sectional SEM image). If the pore area ratio is in this range, the catalyst layer 10 includes voids having sufficient gas permeability and drainage properties. The pore area ratio is preferably 27.0% or more and 32.0% or less. The catalyst layer 10 includes three-dimensional network channels formed by continuously connected plurality of pores. The channels permit the gas and water introduced into the catalyst layer 10 to migrate within the catalyst layer 10 and then drain the gas and water externally.

To obtain the cross-sectional SEM image described above, first, the cross-section orthogonal to the interface of the catalyst layer 10 with the polyelectrolyte membrane 11 (hereinafter, referred to as cross-section of the catalyst layer 10) is exposed. The method includes known methods such as ion milling and ultramicrotomy. In general, the catalyst layer 10 is processed to expose the cross-section with the catalyst layer 10 bonded to the polyelectrolyte membrane 11. Thus, when this process is performed, the catalyst layer 10 is preferably cooled while being processed to reduce damage to the polyelectrolyte 14, which constitutes the polyelectrolyte membrane 11 or the catalyst layer 10.

Subsequently, the cross-sectional image of the catalyst layer 10 is acquired using the scanning electron microscope (SEM). The magnification of the image acquired by the SEM is approximately 10,000 to 30,000 times, preferably.

Subsequently, pores are detected by performing image processing such as trimming, filtering, and binarization. As shown in FIGS. 1(a) and 1(b), in the binarized image, the pixels constituting each pore are shown as black pixels. The number of continuous black pixels is counted, and the product of the number of black pixels and the area of one pixel is multiplied to obtain the area of one pore. The areas of all pores in the cross-sectional SEM image are calculated and integrated to obtain the area Sp. The ratio of the area Sp to the area S0 of the entire binarized image is obtained as the pore area ratio (Sp/S0).

Figure 5:
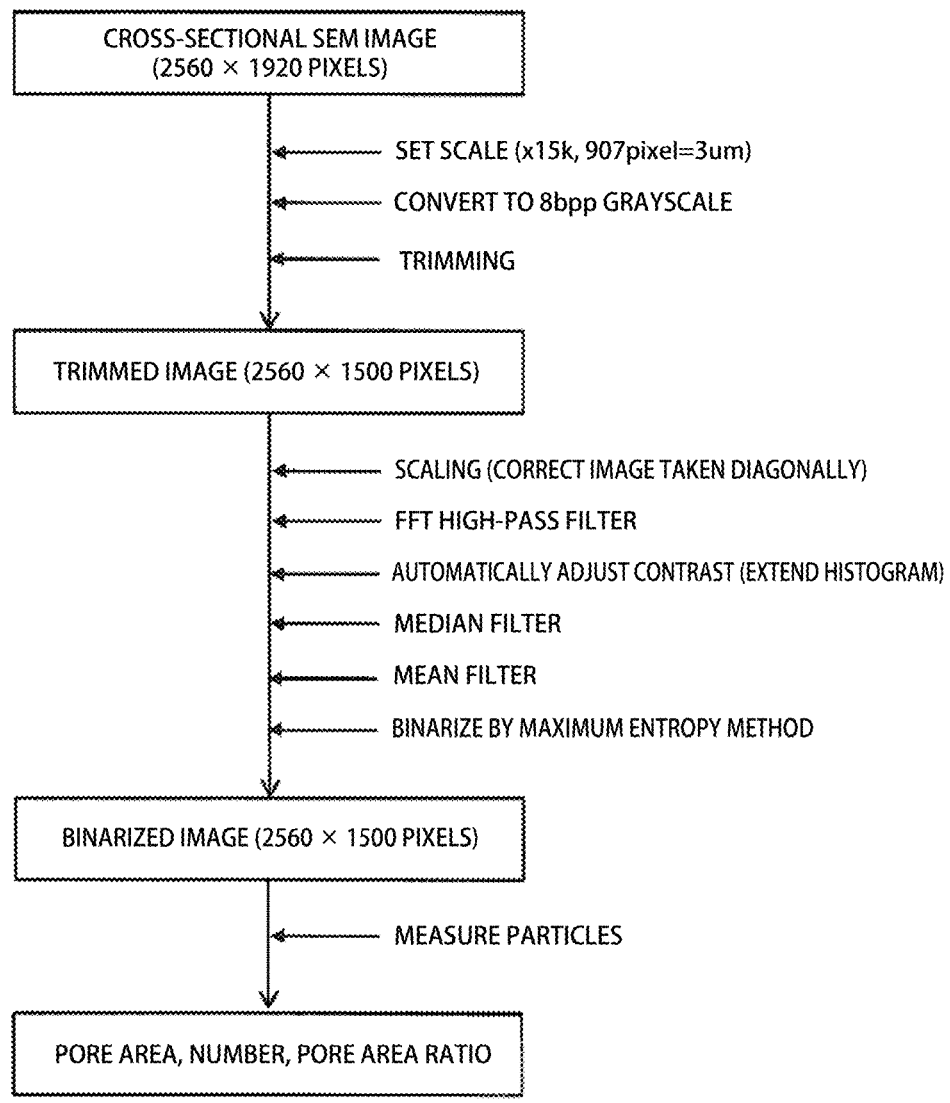
FIG. 5 is a flowchart illustrating an image processing routine of a cross-sectional SEM image.

More specifically, for example, the cross-section of the catalyst layer is exposed using Cryo cross-section polisher "IB-19520CCP" manufactured by JEOL Ltd., and the cross-sectional image is captured to acquire the cross-sectional SEM image using an "FE-SEM S-4800" manufactured by Hitachi High-Tech Corporation. The acquired cross-sectional SEM image is subjected to image processing as shown in FIG. 5 using open source image processing software "Image J" to obtain the area, the number, and the area ratio of the pores.

In the cross-sectional SEM image of the catalyst layer 10, the ratio (Sg/Sp) of the total area Sg of pores having an area larger than 90000 nm2 to the total area Sp of all pores is 15.0% or more and 30.0% or less. Thus, the catalyst layer has a broad pore-size distribution and is partially nonuniform. This improves the gas permeability and the drainage of produced water while maintaining triple phase boundaries.

In the cross-sectional SEM image, the area ratio in the region closer to the membrane (the area ratio of the pores existing in a range of 0.5 µm or more and 5.5 µm or less from the interface with the polyelectrolyte membrane 11), and the area ratio in the region facing away from the membrane (the area ratio of the pores existing in a range of 0.5 µm or more and 5.5 µm or less from the surface opposite to the interface) are compared. According to the comparison result, the area ratio in the region facing away from the membrane is larger than the area ratio in the region closer to the membrane. With this configuration, the catalyst layer 10 includes voids having more sufficient gas permeability and drainage properties. The area ratio of the region closer to the membrane is more preferably 25.0% or more and 30.0% or less, and the area ratio of the region facing away from the membrane is more preferably 30.0% or more and 35.0% or less.

The thickness of the catalyst layer 10 is preferably 5 µm or more and 30 µm or less. If the thickness is greater than 30 µm, cracks are likely to occur, and when the catalyst layer 10 is used in a fuel cell, the permeability of gas and the conductivity and generated water are decreased, resulting in a decrease in output. If the thickness is less than 5 µm, the thickness of the layer is likely to vary, so that the catalytic substance and the polyelectrolyte inside the layer are likely to be nonuniform. Cracks on the surface of the catalyst layer and the nonuniformity of the thickness are not preferred since they are likely to adversely affect the durability when the catalyst layer 10 is used in a fuel cell and operated for a long period.

The thickness of the catalyst layer 10 can be measured by, for example, observing the cross-section of the catalyst layer 10 using a scanning electron microscope (SEM). The method for exposing the cross-section of the catalyst layer 10 includes, for example, known methods such as ion milling and ultramicrotomy. In order to expose the cross-section of the catalyst layer 10, the catalyst layer 10 is preferably cooled while being processed to reduce damage to the polyelectrolyte 14 which constitutes the polyelectrolyte membrane 11 and the catalyst layer 10.

Examples of the catalytic substance 12 include platinum group elements, other metals, or alloys, oxides, complex oxides, and carbides of these substances. The platinum group elements include platinum, palladium, ruthenium, iridium, rhodium, and osmium. Examples of other metals include iron, lead, copper, chromium, cobalt, nickel, manganese, vanadium, molybdenum, gallium, and aluminum.

The conductive carrier 13 may be any conductive carrier as long as it is conductive and is capable of supporting the catalytic substance 12 without being affected by the catalytic substance 12. Typically, carbon particles are used as the conductive carrier 13. Examples of the carbon particles include carbon black, graphite, black lead, activated carbon, carbon nanotubes, carbon nanofibers, and fullerenes. If the particle diameter of the carbon particles is too small, the catalyst layer 10 is too dense, so that the gas permeability of the catalyst layer 10 is likely to decrease. If the particle diameter is too large, the dispersion is hindered and cracks are likely to occur. Thus, the particle diameter is preferably about 10 to 1000 nm. The particle diameter is more preferably about 10 to 100 nm.

The polyelectrolyte 14 contained in the polyelectrolyte membrane 11 and the catalyst layer 10 may be any polyelectrolyte as long as it has proton conductivity. Examples of the polyelectrolyte include a fluorine-based polyelectrolyte and a hydrocarbon-based polyelectrolyte. The fluorine-based polyelectrolyte may be a polyelectrolyte having a tetrafluoroethylene backbone such as Nafion (registered trademark) manufactured by Du Pont.

The hydrocarbon-based polyelectrolyte may be made from, for example, sulfonated polyether ketone, sulfonated polyether sulfone, sulfonated polyether ether sulfone, sulfonated polysulfide, and sulfonated polyphenylene.

The polyelectrolyte contained in the polyelectrolyte membrane 11 and the polyelectrolyte 14 contained in the catalyst layer 10 may be the same as or different from each other. Note that, considering the interface resistance between the polyelectrolyte membrane 11 and the catalyst layer 10, and the dimension change ratio of the polyelectrolyte membrane 11 and the catalyst layer 10 when the humidity is changed, it is preferable that the polyelectrolyte contained in the polyelectrolyte membrane 11 and the polyelectrolyte 14 contained in the catalyst layer 10 are the same polyelectrolyte or include similar components.

The fibrous material 15 may be formed of electron conducting fibers and proton conductive fibers. Examples of electron conducting fibers include carbon fibers, carbon nanotubes, carbon nanohorns, and conductive polymer nanofibers. In view of conductivity and dispersibility, carbon nanofibers are preferably used as the fibrous material 15.

Electron conducting fibers having catalytic ability are more preferable in reducing the use of the catalyst formed of a precious metal. If the catalyst layer 10 is used as an oxygen-electrode-side catalyst layer forming the oxygen electrode, the catalytic electron conducting fibers may be a carbon alloy catalyst prepared from carbon nanofibers. The electron conducting fibers having catalytic ability may be fibers obtained by processing an electrode active material for a fuel electrode into fibrous form. The electrode active material may be material containing at least one transition metal element selected from the group consisting of Ta, Nb, Ti, and Zr. Examples of the material containing the transition metal element include a partial oxide of a transition metal carbonitride, a conductive oxide of a transition metal element, and a conductive oxynitride of a transition metal element.

The proton conductive fibers may be any fiber as long as the fiber is obtained by processing a polyelectrolyte having proton conductivity into a fibrous form. The proton conductive fibers may be formed of, for example, a fluorine-based polyelectrolyte or a hydrocarbon-based polyelectrolyte.

Examples of the fluorine-based polyelectrolyte may be Nafion (registered trademark) manufactured by DuPont, Flemion (registered trademark) manufactured by Asahi Glass Co., Ltd, Aciplex (registered trademark) manufactured by Asahi Kasei Co., Ltd, and Gore-Select (registered trademark) manufactured by Gore. Examples of the hydrocarbon-based polyelectrolyte may be an electrolyte made from a sulfonated polyether ketone, sulfonated polyether sulfone, sulfonated polyether ether sulfone, sulfonated polysulfide, sulfonated polyphenylene, sulfonated polyimide, and an acid-doped polybenzoazoles.

As the fibrous material 15, only one kind of the above-mentioned fibers may be used. Alternatively, two or more kinds of fibers may be used. As the fibrous material 15, the electron conducting fibers and the proton conductive fibers may be used in combination. The fibrous material 15 preferably includes at least one selected from a group consisting of carbon nanofibers, carbon nanotubes, and electrolyte fibers among the above-mentioned fibrous materials 15.

The fiber diameter of the fibrous material 15 is preferably 0.5 to 500 nm and is more preferably 5 to 200 nm. Setting the fiber diameter within this range increases the voids in the catalyst layer 10, which in turn increases the output.

Additionally, the fiber length of the fibrous material 15 is preferably 1 to 50 μm and is more preferably 1 to 20 μm. Setting the fiber length within this range increases the strength of the catalyst layer 10, which in turn reduces the occurrence of cracking while the catalyst layer 10 is being formed. This also increases the voids in the catalyst layer, which in turn increases the output.

[Configuration of Membrane Electrode Assembly]

Figure 3A:
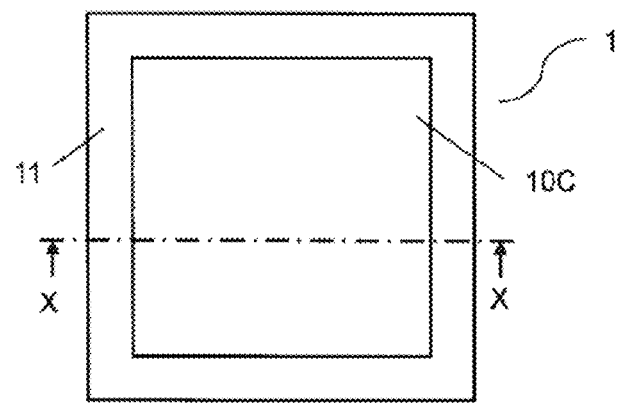
FIG. 3(a) is a plan view illustrating a membrane electrode assembly according to the embodiment.
Figure 3B:
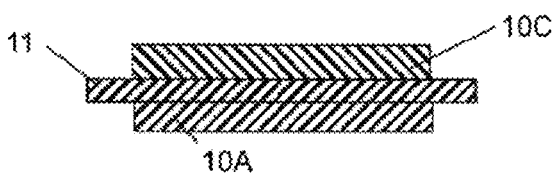
FIG. 3(b) is a cross-sectional view taken along line X-X of FIG. 3(a).

As shown in FIGS. 3(a) and 3(b), a membrane electrode assembly 1 of the present embodiment includes a polyelectrolyte membrane 11, and catalyst layers 10C and 10A bonded on respective sides of the polyelectrolyte membrane 11. In the present embodiment, the catalyst layer 10C, which is formed on the upper surface of the polyelectrolyte membrane 11, is a cathode-side catalyst layer constituting the oxygen electrode, and the catalyst layer 10A, which is formed on the lower surface of the polyelectrolyte membrane 11, is an anode-side catalyst layer constituting the fuel electrode. Hereinafter, the pair of catalyst layers 10C and 10A will sometimes be referred to as "catalyst layer 10" when there is no need to distinguish them. The periphery of the catalyst layers 10 may be sealed with, for example, gaskets (not shown).

The preparation of the catalyst layers 10 and the bonding of the catalyst layers 10 to the surfaces of the polyelectrolyte membrane 11 are performed as follows.

First, at least the catalytic substance 12, the conductive carrier 13, the polyelectrolyte 14, and, if necessary the fibrous material 15, which are described above, are mixed in a solvent and are subjected to a dispersion process, and thus a catalyst ink is prepared.

As the dispersion process, for example, various techniques using a planetary ball mill, bead mill, and ultrasonic homogenizer can be used.

There is no particular limitation on the solvent used as the dispersion medium of the catalyst ink as long as the solvent does not erode the catalytic substance 12, the conductive carrier 13, the polyelectrolyte 14, or the fibrous material 15 and is capable of dissolving the polyelectrolyte 14 in a highly fluid state or dispersing the polyelectrolyte 14 as fine gel. For example, water, a single organic solvent, a mixture of multiple organic solvents, and a mixture thereof can be used.

At least a volatile organic liquid solvent is preferably contained in the catalyst ink. In this case, if a solvent containing lower alcohol is used as these solvents, a mixture of the lower alcohol and water is preferably used because such a solvent containing lower alcohol has a high risk of ignition. The amount of water may be within a range which can avoid the polyelectrolyte 14 from being separated and causing turbidity or gelation. Otherwise, there is no other specific limitation.

The prepared catalyst ink is applied to a substrate and is dried, so that solvent components are removed from the catalyst ink membrane, and the catalyst layer 10 is formed on the substrate.

In a case in which the polyelectrolyte membrane 11 serves as the substrate, for example, the catalyst ink is directly applied to the surface of the polyelectrolyte membrane 11, and then solvent components are removed from the catalyst ink membrane to form the catalyst layer 10.

Alternatively, if a transfer substrate is used as the substrate, first, the catalyst ink is applied to the transfer substrate and is dried to prepare a transfer substrate having a catalyst layer. Subsequently, the surface of the catalyst layer 10 of the transfer substrate having the catalyst layer is brought into contact with the polyelectrolyte membrane 11 to be heated and pressurized, so that they are bonded together. Subsequently, the transfer substrate is peeled off from the catalyst layer 10.

If the catalyst layer 10 is formed by the method described above, because the solvent escapes through the particles or the fibrous material toward the coated surface during the drying process, the catalyst layer 10 obtains three-dimensional network channels in which multiple pores are continuously connected. Since the catalyst layer 10 has such three-dimensional network channels, the movement of gas and produced water is unlikely to be hindered.

The formation of such three-dimensional network channels can be examined using a cross-sectional SEM image as discussed below.

As a method for applying the catalyst ink to the substrate, various coating methods such as die coating, roll coating, curtain coating, spray coating, and squeegee coating can be used. In particular, die coating is preferred. Die coating is also applicable to intermittent coating since it ensures stable film thickness at a middle section of the coating. Furthermore, as a method for drying the applied catalyst ink, for example, drying using a hot air oven, IR (far-infrared radiation) drying, drying using a hot plate, and reduced-pressure drying can be used. The drying temperature is about 40 to 200° C. and is preferably about 40 to 120° C. The drying time is about 0.5 minutes to 1 hour and is preferably about 1 minute to 30 minutes.

When the transfer substrate including the catalyst layer is used to bring the polyelectrolyte membrane 11 and the catalyst layer 10 into contact with each other to be heated and pressurized so that they are bonded together, the pressure applied to the catalyst layer 10 and the temperature of the catalyst layer 10 influence the power generation performance of the membrane electrode assembly. To obtain a membrane electrode assembly having high power generation performance, the pressure applied to a laminate is preferably 0.1 MPa or more and 20 MPa or less. If the pressure is greater than 20 MPa, the catalyst layer 10 is excessively compressed. If the pressure is less than 0.1 MP, the bonding properties between the catalyst layer 10 and the polyelectrolyte membrane 11 are decreased. In these cases, the power generation performance is decreased. In order to improve the bonding properties at the interface between the polyelectrolyte membrane 11 and the catalyst layer 10 and to inhibit the interface resistance, the temperature during bonding is preferably set in the vicinity of a glass-transition point of the polyelectrolyte 14 in the polyelectrolyte membrane 11 or the catalyst layer 10.

Examples of the substrate used for the transfer substrate having the catalyst layer include sheets made of fluororesins and polymer films. Fluororesins have better or even excellent transfer properties and examples of the fluororesins include ethylene tetrafluoroethylene copolymer (ETFE), tetrafluoroethylene-hexafluoropropylene copolymer (FEP), tetrafluoroperfluoroalkyl vinyl ether copolymer (PFA), and polytetrafluoroethylene (PTFE). Examples of a polymer films include those made of polyimide, polyethylene terephthalate, polyamide (Nylon (registered trademark)), polysulfone, polyethersulfone, polyphenylene sulfide, polyether ether ketone, polyetherimide, polyarylate, and polyethylene naphthalate. As a substrate not removed after the transfer, a gas diffusion layer may also be used.

It is possible to set the pores of the catalyst layer 10 in a suitable range by adjusting the heating temperature and the heating speed of the applied catalyst ink, the pressurizing condition until the catalyst ink is dried, the solvent composition of the catalyst ink, the dispersion strength during catalyst ink preparation, and a blending ratio of the fibrous material 15.

For example, a blending ratio of the electrolyte 14 in the catalyst layer 10 is preferably about the same to about half the weight of the conductive carrier 13. The blending ratio of the fibrous material 15 is preferably about the same to about half the weight of the conductive carrier 13. The solid content ratio of the catalyst ink is preferably high within the range in which the catalyst ink is applied to form a thin film.

[Configuration of Polyelectrolyte Fuel Cell]

Figure 4:
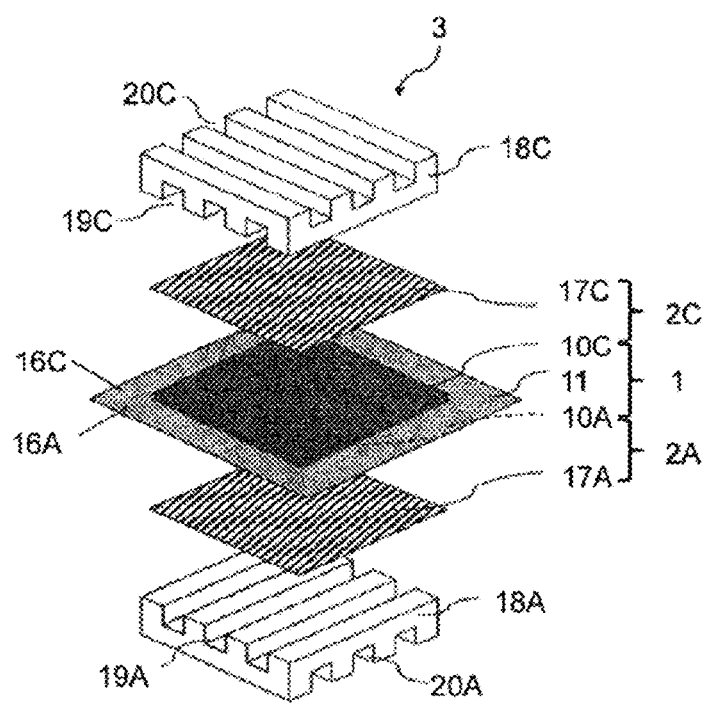
FIG. 4 is an exploded perspective view illustrating a polyelectrolyte fuel cell according to the embodiment.

As shown in FIG. 4, a polyelectrolyte fuel cell 3 of the present embodiment includes the membrane electrode assembly 1, a gas diffusion layer 17C, and a gas diffusion layer 17A. The gas diffusion layer 17C is located to face the catalyst layer 10C on the cathode side of the membrane electrode assembly 1. The gas diffusion layer 17A is located to face the catalyst layer 10A on the anode side of the membrane electrode assembly 1. The catalyst layer 10C on the cathode side and the gas diffusion layer 17C form an oxygen electrode 2C, and the catalyst layer 10A on the anode side and the gas diffusion layer 17A form a fuel electrode 2A. A gasket 16C on the oxygen electrode (cathode) side and a gasket 16A on the fuel electrode (anode) side are located to prevent gas leakage from the periphery of the polyelectrolyte membrane 11 where the catalyst layers are not bonded.

Furthermore, the polyelectrolyte fuel cell 3 includes a separator 18C, which is located to face the oxygen electrode 2C, and a separator 18A, which is located to face the fuel electrode 2A. The separator 18C includes gas flow channels 19C for passage of a reaction gas and cooling water flow channels 20C for passage of a coolant. The gas flow channels 19C are formed on the surface facing the gas diffusion layer 17C. Cooling water flow channels 20C are formed on the opposite surface of the separator 18C to the surface in which the gas flow channels 19C are formed. The separator 18A has the same structure as the separator 18C and includes gas flow channels 19A, which are formed on the surface facing the gas diffusion layer 17A, and cooling water flow channels 20A, which are formed on the opposite surface of the separator 18A to the surface in which the gas flow channels 19A are formed. The separators 18C and 18A are made of a material electrically conductive and impermeable to gas.

In the polyelectrolyte fuel cell 3, an oxidizing agent such as air or oxygen is supplied to the oxygen electrode (cathode) 2C through the gas flow channels 19C of the separator 18C, and a fuel gas containing hydrogen or an organic fuel is supplied to the fuel electrode (anode) 2A through the gas flow channels 19A of the separator 18A, so that electric power is generated.

In the polyelectrolyte fuel cell 3, a reaction represented by the following reaction formula (1) occurs in the fuel electrode 2A, and a reaction represented by the following reaction formula (2) occurs in the oxygen electrode 2C.

$$H_2 \rightarrow 2H^+ + 2e^- \tag{1}$$

$$1/2O_2 + 2H^+ + 2e^- \rightarrow H_2O \tag{2}$$

As described above, the polyelectrolyte fuel cell 3 according to the present embodiment is a fuel cell that generates water at the oxygen electrode 2C when the gas containing oxygen is supplied to the oxygen electrode 2C.

By employing the membrane electrode assembly 1 which includes the catalyst layers 10 described above, sufficient drainage properties and gas permeability are achieved, and high power generation performance can be exerted for a long period.

In other words, the present embodiment provides the catalyst layer and the membrane electrode assembly that have sufficient drainage properties and gas permeability and are capable of exerting high power generation performance for a long period during the operation of the polyelectrolyte fuel cell, by specifying the ratio of the pores in the catalyst layer, the size of the pores, and their distribution. Consequently, a polyelectrolyte fuel cell capable of exerting high power generation performance for a long period is provided.

As described above, the catalyst layer 10 of the present embodiment can be applied to the catalyst layer 10A of the fuel electrode (anode) 2A side and can also be applied to the catalyst layer 10C of the oxygen electrode (cathode) 2C side.

As shown in the above reaction formula (2), in the oxygen electrode 2C, water is generated from oxygen, protons, and electrons. If the water generated in the oxygen electrode 2C is not drained from the oxygen electrode 2C, the water hinders the oxygen-containing gas from being supplied to the oxygen electrode 2C. Under such circumstances, the power generation performance of the polyelectrolyte fuel cell 3 is undesirably decreased.

In contrast, since the catalyst layer 10 of the present embodiment has high drainage properties when the above conditions are satisfied, the catalyst layer 10 significantly enhances the power generation performance of the polyelectrolyte fuel cell 3 in the case in which the catalyst layer 10 is used as the catalyst layer 10C provided with the oxygen electrode 2C.

The configuration of the catalyst layer 10 described above is applied to both the catalyst layer 10C on the cathode side and the catalyst layer 10A on the anode side. However, the configuration of the catalyst layer 10 may only be applied to either of the catalyst layer 10C on the cathode side and the catalyst layer 10A on the anode side. In this case, the catalyst layer 10 is more preferably applied to the catalyst layer 10C on the cathode side. If the catalyst layer 10 is applied to the catalyst layer 10C on the cathode side, the drainage properties for water generated in the catalyst layer 10C on the cathode side and the permeability of gas that flows into the catalyst layer 10C on the cathode side are both improved. As a result, the output of the polyelectrolyte fuel cell is inhibited from being decreased.

The polyelectrolyte fuel cell 3 shown in FIG. 4 is a polyelectrolyte fuel cell that has a single cell structure including one membrane electrode assembly. However, the catalyst layer according to one aspect may be a polyelectrolyte fuel cell that has a structure in which multiple single cells are stacked.

EXAMPLES

Examples and comparative examples will now be described.

[Preparation of Membrane Electrode Assembly]

Membrane electrode assemblies according to Examples 1 to 5 and Comparative Examples 1 to 5 were prepared by the following method.

In Example 1, a platinum-on-carbon catalyst (TEC10E50E manufactured by Tanaka Kikinzoku Kogyo K.K.), water, 1-propanol, polyelectrolyte (Nafion (registered trademark) dispersed liquid manufactured by Wako Pure Chemical Industries, Ltd.), and carbon nanofibers (VGCF-H (registered trademark) manufactured by Showa Denko K.K.) were mixed. The platinum-on-carbon catalyst is a platinum catalyst supported on carbon particles. The blending ratio of the carbon particles to the polyelectrolyte was 1:1 by mass ratio. The mixture was dispersed in a planetary ball mill at 300 rpm for 60 minutes to prepare a catalyst ink. At this time, zirconia balls having a diameter of 5 mm were added to the mixture. The amount of the zirconia balls added was about one-third of the zirconia container. The mass of the polyelectrolyte was adjusted to be 100% by mass with respect to the mass of the carbon particles, the mass of the fibrous material was adjusted to be 100% by mass with respect to the mass of the carbon particles, the ratio of the water in the dispersion medium was adjusted to be 50% by mass, and the solid content in the ink was adjusted to be 10% by mass.

The prepared catalyst ink was applied to both surfaces of the polyelectrolyte membrane (Nafion 211 (registered trademark) manufactured by Dupont) using a slit die coater and was dried on an adsorption stage at 100° C. until tack-free. The catalyst ink was applied to the cathode side to a thickness of 150 μm, and was also applied to the anode side to a thickness of 100 μm. Thus, the cathode-side catalyst layer was formed on one side of the polyelectrolyte membrane, and the anode-side catalyst layer was formed on the other side. In this manner, the membrane electrode assembly was obtained that includes the polyelectrolyte membrane having the cathode-side catalyst layer and the anode-side catalyst layer bonded on either side of the polyelectrolyte membrane. The cathode-side catalyst layer and the anode-side catalyst layer are the same as each other in the membrane electrode assembly of Example 1.

In Example 2, the membrane electrode assembly was obtained by the same procedure as Example 1 except that multilayer carbon nanotubes (diameter 60-100 nm, manufactured by Tokyo Chemical Industry Co., Ltd.) were used as the fibrous material used for the cathode-side catalyst layer instead of carbon nanofibers.

In Example 3, the membrane electrode assembly was obtained in the same manner as in Example 1 except that the amount of the catalyst ink applied in forming the cathode-side catalyst layer was doubled.

In Example 4, the membrane electrode assembly was obtained in the same manner as in Example 1 except that the amount of the carbon nanofibers was half of the case of Example 1.

In Example 5, first, the catalyst ink prepared by the same method as in Example 1 was applied to the surface of the PTFE film (transfer substrate) using the slit die coater and was dried on the adsorption stage at 100° C. until tack-free to obtain two transfer substrates having a catalyst layer. The catalyst ink was applied to the cathode side to a thickness of 150 μm, and was also applied to the anode side to a thickness of 60 μm. Subsequently, these transfer substrates having a catalyst layer were laminated so that the catalyst layers face respective sides of the polyelectrolyte membrane (Nafion 211 (registered trademark) manufactured by Dupont) to obtain a laminate. The laminate was hot-pressed under the conditions of 120° C. and 5 MPa to be bonded, and then the PTFE films were peeled off to obtain the membrane electrode assembly.

In Comparative Example 1, the membrane electrode assembly was obtained in the same manner as in Example 1 except that the carbon nanofiber content in the catalyst ink used for forming the cathode-side catalyst layer was doubled.

In Comparative Example 2, the membrane electrode assembly was obtained in the same manner as in Example 1 except that the content of water and 1-propanol in the catalyst ink used for forming the cathode-side catalyst layer was doubled.

In Comparative Example 3, the membrane electrode assembly was obtained in the same manner as in Example 1 except that carbon nanotubes (NC7000 (trademark) manufactured by Nanocyl) were used as the fibrous material used for the cathode-side catalyst layer instead of carbon nanofibers.

In Comparative Example 4, the membrane electrode assembly was obtained in the same manner as in Example 1 except that the amount of the carbon nanofibers in the cathode-side catalyst layer was 1/10 of that in Example 1.

In Comparative Example 5, the membrane electrode assembly was obtained in the same manner as in Example 1 except that the carbon nanofibers were not included in the catalyst ink used for forming the cathode-side catalyst layer.

[State of Catalyst Layer and Its Evaluation]

The cathode-side catalyst layers constituting the membrane electrode assemblies of Examples 1 to 5 and the membrane electrode assemblies of Comparative Examples 1 to 5 were examined to obtain the pore area ratio (Sp/S0), the ratio (Sg/Sp) of the total area Sg of pores having an area of 90000 nm2 or larger to the total area Sp of all pores, and the thickness T of the cathode side catalyst layer. Furthermore, the power generation performance of polyelectrolyte fuel cells including the membrane electrode assemblies of Examples 1 to 5 and the membrane electrode assemblies of Comparative Examples 1 to 5 was measured. These experiments and measurements will be described below.

<Pore Area Ratio (Sp/S0)>

The pore area ratio (Sp/S0) was derived by acquiring a cross-sectional SEM image and conducting image processing. More specifically, first, about 2 mm square pieces were cut out from five positions of each membrane electrode assembly. Each piece was processed using a Cryo cross-section polisher "IB-19520CCP" manufactured by JEOL Ltd. to expose a cross-section orthogonal to the interface of the cathode-side catalyst layer with the polyelectrolyte membrane. Subsequently, the cross-sectional image of each cathode-side catalyst layer was captured using FE-SEM "S-4800" manufactured by Hitachi High-Tech Corporation at 15000 times magnification to acquire a cross-sectional SEM image having a resolution of 2560×1920.

Cross-sectional SEM images were obtained at three positions per each piece, that is, in the vicinity of the interface with the polyelectrolyte membrane (region closer to the membrane), in the vicinity of the surface not bonded to the polyelectrolyte membrane (region facing away from the membrane), and in the central area of the layer. The vicinity of the interface with the polyelectrolyte membrane refers to, more specifically, a range of 0.5 μm or more and 5.5 μm or less from the interface (interface) with the polyelectrolyte membrane. Furthermore, the vicinity of the surface not bonded to the polyelectrolyte membrane (region facing away from the membrane) refers to, more specifically, a range of 0.5 μm or more and 5.5 μm or less from the surface opposite to the interface with the polyelectrolyte membrane.

The open source image processing software "Image J" was used to conduct image processing as shown in FIG. 5 on the acquired cross-sectional SEM images to obtain a list of areas of individual pores. Note that, if the continuous black pixels were less than 10 pixels, the black pixels were regarded as noise and thus excluded.

The ratio (pore area ratio Sp/S0) of the area (total area of pores) Sp obtained by the summation of the areas of all pores to the area S0 of the entire binarized image was derived using the list of the areas of individual pores. Forty-five pore area ratios obtained per each membrane electrode assembly were averaged, and the average was referred to as the pore area ratio of each membrane electrode assembly.

Additionally, the pore area ratio in the vicinity of the interface (region closer to the membrane) with the polyelectrolyte membrane and the pore area ratio in the vicinity of the surface not bonded to the polyelectrolyte membrane (region facing away from the membrane), which were obtained by the above method, were used to examine the size relationship between the pore area ratio of the region closer to the membrane and the pore area ratio of the region facing away from the membrane. More specifically, the size relationship was checked at 15 positions per membrane electrode assembly, and either of the two regions having larger pore area ratio is shown in the following table.

<Ratio (Sg/Sp) of Pores Larger than 90000 nm$^2$>

Pores larger than 90000 nm$^2$ were extracted from the list of the areas of pores obtained by the image processing of the cross-sectional SEM image described above to calculate the total area Sg, which is then divided by the total area Sp of all pores to derive Sg/Sp.

<Thickness of Cathode-Side Catalyst Layer>

The thickness of the cathode-side catalyst layer was measured by observing a cross-section of the cathode-side catalyst layer using a scanning electron microscope (SEM). More specifically, the cross-section used in deriving the pore area ratio described above was observed using an "FE-SEM S-4800" manufactured by Hitachi High-Tech Co., Ltd. at 1000 times magnification. The thickness of the catalyst layer was measured at 5 observation points per piece, and the average value of 25 positions was obtained as the thickness T of the cathode-side catalyst layer of each membrane electrode assembly.

<Verification of Three-Dimensional Network Channels>

Whether the three-dimensional network channels in which pores are continuously connected are formed in the catalyst layer was determined by the following method.

The cross-section of the cathode-side catalyst layer used for deriving the pore area ratio described above is observed using the scanning electron microscope (SEM). Let us assume the thickness direction (up-and-down direction on the page) of the catalyst layer as shown in FIGS. 1(a) and 1(b) is defined as a Y-direction, and the direction perpendicular to the thickness direction is defined as an X-direction (left-and-right direction on the page). Based on this assumption, first, the number of black pixels (pixels constituting the pores) in a certain row Ya in the X-direction is added up. Subsequently, the sum of black pixels is divided by the number of all pixels constituting the row Ya to calculate the pore ratio in the row Ya. This operation is performed in each row in the Y-direction.

As a result, if the calculated pore ratio is 10% or more in all the rows, it is determined that the three-dimensional network channels, in which multiple pores are continuously connected, are formed in the catalyst layer.

<Measurement of Power Generation Performance and Its Evaluation>

The gas diffusion layers, the gaskets, and the separators were placed on either side of each membrane electrode assembly and were tightened to a predetermined surface pressure to prepare a single cell for evaluation. Each single cell for evaluation was subjected to I-V measurement described in "Cell Evaluation Analysis Protocol" which is a booklet published by New Energy and Industrial Technology Development Organization (NEDO). That is, the I-V measurement was performed.

If the current was 30 A or more at a voltage of 0.6V, an evaluation of "Good" was made. If the current was less than 30 A an evaluation of "Poor" was made, and if the current was less than 20 A an evaluation of "Very Poor" was made.

<Comparison Results>

The results are shown in Table 1.

TABLE 1

| | Sp/So [%] | Sg/Sp [%] | Size Relationship between Pore Area Ratios | T [μm] | Power Generation Performance |
|---|---|---|---|---|---|
| Example 1 | 32.0 | 23.0 | Greater in region facing away from membrane | 14 | Good |
| Example 2 | 28.0 | 19.2 | Greater in region facing away from membrane | 12 | Good |
| Example 3 | 31.0 | 20.1 | Greater in region facing away from membrane | 29 | Good |
| Example 4 | 32.8 | 24.6 | Greater in region facing away from membrane | 9 | Good |
| Example 5 | 28.9 | 15.1 | Greater in region closer to membrane | 12 | Good |
| Comparative Example 1 | 35.2 | 39.0 | Greater in region facing away from membrane | 31 | Poor |
| Comparative Example 2 | 24.2 | 12.7 | Greater in region closer to membrane | 12 | Very Poor |
| Comparative Example 3 | 24.6 | 23.6 | Greater in region closer to membrane | 11 | Poor |
| Comparative Example 4 | 23.6 | 20.4 | Greater in region facing away from membrane | 11 | Poor |
| Comparative Example 5 | 23.0 | 5.6 | Greater in region closer to membrane | 11 | Very Poor |

As shown in Table 1, in every one of Examples 1 to 5, the pore area ratio Sp/S$_0$ of the cross-sectional SEM image was within a range of 25.0% or more and 35.0% or less. Additionally, in every one of Examples 1 to 5, it was confirmed that three-dimensional network channels, in which multiple pores are continuously connected, were formed in the catalyst layer. The power generation performance was "Good" in every one of Examples 1 to 5. That is, in Examples 1 to 5, membrane electrode assembly was obtained that is capable of constituting a fuel cell that is improved or even excellent in power generation performance.

In contrast, in the comparative examples, the pore area ratio $Sp/S_0$ of the cross-sectional SEM image of all of Comparative Examples 1 to 5 was outside the range of 25.0% or more and 35.0% or less. The power generation performance was "Poor" in every comparative example. Furthermore, if the ratio of pores larger than 90000 nm2 was not within the range of 15.0% or more and 30.0% or less, or if the size relationship between the pore area ratios was not the specified relationship, the power generation performance further decreased and the result was "Very Poor". That is, if the ratio of pores in the catalyst layer, the size, and its distribution were out of the range, the power generation performance was decreased.

INDUSTRIAL APPLICABILITY

According to the present invention, the ratio of the pores in the catalyst layer, the size, and its distribution are specified. Thus, the present invention can provide a catalyst layer, a membrane electrode assembly, and a polyelectrolyte fuel cell that have sufficient drainage properties and gas permeability and are capable of exerting high power generation performance for a long period during operation of the polyelectrolyte fuel cell. Thus, the present invention is suitable for, for example, stationary cogeneration systems and fuel cell cars that utilize the polyelectrolyte fuel cells. Thus, the present invention has great industrial value.

REFERENCE SIGNS LIST

1 . . . Membrane electrode assembly; 2C . . . Oxygen electrode; 2A . . . Fuel electrode; 3 . . . Polyelectrolyte fuel cell; 10 . . . Catalyst layer; 10A . . . Anode-side catalyst layer; 10C . . . Cathode-side catalyst layer; 11 . . . Polyelectrolyte membrane; 12 . . . Catalytic substance; 13 . . . Conductive carrier; 14 . . . Polyelectrolyte; 15 . . . Fibrous material; 16C, 16A . . . Gasket; 17C, 17A . . . Gas diffusion layer; 18C, 18A . . . Separator; 19C, 19A . . . Gas flow channel; 20C, 20A . . . Cooling water flow channel.

What is claimed is:

1. A catalyst layer including an interface to a polyelectrolyte membrane, comprising:
a layer forming material comprising a catalytic substance, a conductive carrier supporting the catalytic substance, a polyelectrolyte and a fibrous material, and a plurality of pores containing no layer forming material, wherein
a cross-sectional image captured by a scanning electron microscope shows (a) a pore area ratio which is a total area ratio of the plurality of pores of the layer forming material to an area of a cross-section of the layer forming material, which cross-section is orthogonal to the interface, of 25.0% or more and 35.0% or less and (b) a total area ratio of pores having an area larger than 90000 nm$^2$ to the total area of the pores of 15.0% or more and 30.0% or less.

2. The catalyst layer of claim 1, wherein
the plurality of pores forms a three-dimension network in which pores of said plurality or pores are continuously connected.

3. The catalyst layer of claim 1, wherein
the cross-sectional image shows that a pore area ratio in a region facing away from the membrane, which is the pore area ratio in a range of 0.5 μm or more and 5.5 μm or less from a surface facing away from the interface, is greater than a pore area ratio in a region closer to the membrane, which is the pore area ratio in the range of 0.5 μm or more and 5.5 μm or less from the interface.

4. The catalyst layer of claim 3, wherein
the pore area ratio in the region closer to the membrane is 25.0% or more and 30.0% or less, and the pore area ratio in the region facing away from the membrane is 30.0% or more and 35.0% or less.

5. The catalyst layer of claim 1, wherein
at least either an electron conducting fiber or a proton conductive fiber, as the fibrous material.

6. The catalyst layer of claim 5, wherein
the electron conducting fiber as the fibrous material, wherein the electron conducting fiber is at least one type selected from a carbon nanofiber, a carbon nanotube, and a transition metal containing fiber.

7. The catalyst layer of claim 1, wherein
the catalyst layer has a thickness of 5 μm or more and 30 μm or less.

8. A membrane electrode assembly, comprising:
a polyelectrolyte membrane; and
an anode-side catalyst layer and a cathode-side catalyst layer bonded on respective sides of the polyelectrolyte membrane, wherein
at least one of the anode-side catalyst layer and the cathode-side catalyst layer is the catalyst layer of claim 1.

9. A polyelectrolyte fuel cell comprising the membrane electrode assembly of claim 8.

* * * * *